United States Patent
Hohmann et al.

(10) Patent No.: US 8,398,351 B2
(45) Date of Patent: Mar. 19, 2013

(54) SEGMENTED NUT FOR SCREW CONNECTIONS

(76) Inventors: Frank Hohmann, Warstein (DE); Jörg Hohmann, Meschede (DE)

( * ) Notice: Subject to any disclaimer, the term of this patent is extended or adjusted under 35 U.S.C. 154(b) by 267 days.

(21) Appl. No.: 12/337,987

(22) Filed: Dec. 18, 2008

(65) Prior Publication Data

US 2009/0162166 A1 Jun. 25, 2009

(30) Foreign Application Priority Data

Dec. 22, 2007 (DE) .......................... 10 2007 062 615

(51) Int. Cl.
*F16B 37/10* (2006.01)

(52) U.S. Cl. ........................................................ 411/432

(58) Field of Classification Search .................. 411/432, 411/433, 540, 437
See application file for complete search history.

(56) References Cited

U.S. PATENT DOCUMENTS

| | | | | |
|---|---|---|---|---|
| 663,208 A * | 12/1900 | Wrensch | ........................ | 411/433 |
| 667,808 A * | 2/1901 | Tackaberry | ................... | 285/387 |
| 674,790 A * | 5/1901 | Mullaney | ....................... | 251/274 |
| 937,364 A * | 10/1909 | Dolder | ............................. | 285/33 |
| 1,001,042 A | 8/1911 | Kadel | | |
| 1,162,362 A * | 11/1915 | Hyland | ......................... | 285/409 |
| 1,915,588 A * | 6/1933 | Arrington | ..................... | 411/433 |
| 2,689,141 A * | 9/1954 | Kiekhaefer | .................... | 285/409 |
| 3,201,156 A * | 8/1965 | Coats | ............................. | 285/365 |
| 4,256,197 A | 3/1981 | Kiser, Jr. | | |
| 4,768,909 A | 9/1988 | Warkotsch | | |
| 5,340,255 A * | 8/1994 | Duran | ........................... | 411/373 |
| 5,722,666 A * | 3/1998 | Sisk | ............................... | 277/615 |
| 5,779,418 A * | 7/1998 | Ying-Che | ...................... | 411/433 |
| 5,954,466 A * | 9/1999 | Coffey et al. | .................. | 411/119 |
| 6,523,230 B1 * | 2/2003 | Weinhold | ......................... | 24/273 |
| 6,672,631 B1 * | 1/2004 | Weinhold | ....................... | 285/409 |
| 6,761,467 B2 * | 7/2004 | Matthews et al. | .............. | 362/202 |
| 7,568,873 B1 * | 8/2009 | Rambo | ........................... | 411/433 |
| 7,828,340 B2 * | 11/2010 | Heelan et al. | .................. | 285/409 |

FOREIGN PATENT DOCUMENTS

| | | |
|---|---|---|
| DE | 1 991 256 | 8/1968 |
| DE | 83 08 905 | 6/1983 |
| EP | 1 870 538 A1 | 12/2007 |
| GB | 2 349 678 A | 11/2000 |
| WO | 00/65243 | 11/2000 |
| WO | 2005123345 A1 | 12/2005 |

\* cited by examiner

*Primary Examiner* — Flemming Saether
(74) *Attorney, Agent, or Firm* — Gudrun E. Huckett

(57) ABSTRACT

A nut for a screw connections has, in the circumferential direction, segments that are substantially of the same size, abut one another in separating planes, and are movably guided relative to one another between an open position and a closed position. Closing elements serve for movement of the segments toward one another into the closed position. In order to provide a segmented nut that is suitable for many applications in facility and apparatus engineering, the segments are pivotable relative to one another and connected for this purpose in a first end area in a pivotable way. The closing elements load the segments in the second end areas.

3 Claims, 1 Drawing Sheet

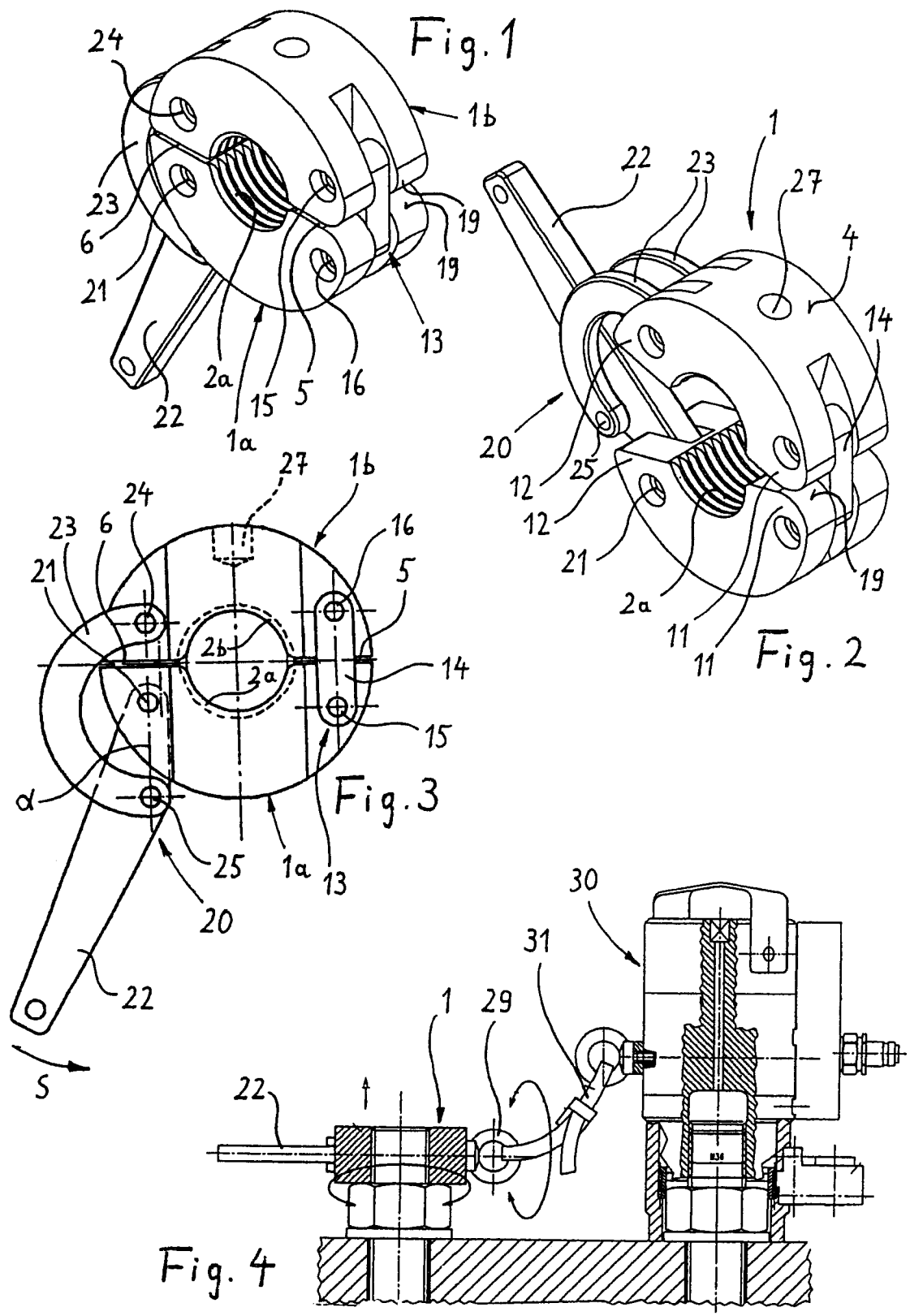

SEGMENTED NUT FOR SCREW CONNECTIONS

BACKGROUND OF THE INVENTION

The invention concerns a nut for screw connections that, in the circumferential direction, is comprised of segments that are substantially of the same size, abut one another in separating planes and are movably guided relative to one another between an open and a closed positions and that further comprises closing means for movement of the segments toward one another into their closed position.

Segmented nuts for use on screws or threaded bolts are known in the prior art. For example, WO 2005/123345 A1 discloses in FIGS. 9C-9F a nut that in the circumferential direction is comprised of three same-type segments. The segments are designed like jaws that, upon actuation of a rotary ring that can be rotated about a central axis of the nut, can be actuated between an open position and a closed positions wherein the jaws carry out a radial movement. In the closed position, inner thread sections formed on the inner side of the segments engage a corresponding outer thread of a threaded bolt. In the open position. the inner thread sections formed on the segments do not engage the outer thread. The segmented nut according to WO 2005/123345 A1 is designed and constructed with respect to the special use in a threaded bolt clamping device. For many other applications in the field of facility and apparatus engineering this segmented nut is less suitable in particular because of the drive action by a rotary ring that is coaxial to the nut, which drive action is unsuitable in many design situations in practice.

SUMMARY OF THE INVENTION

The invention has therefore the object to provide a segmented nut that is suitable for many applications in facility and apparatus engineering.

As a solution it is proposed for a nut with the aforementioned features that the segments are pivotable relative to one another and, for this purpose, are pivotably connected to one another in a first end area.

The advantage of this solution resides in that the segments or jaws for opening and closing must not be moved radially; this has the result that it is not required to provide drive means distributed about the circumference of the nut at several locations but that instead the nut can be brought into an angled open position. As a result of the pivoting action it is possible to arrange the closing means for moving the segments toward one another at a single location, relative to the circumference of the nut. This in practice leads to a broadened field of application of such a segmented nut. An example in practice are e.g. flange screw connections on housings or foundations of wind power devices. The fasting flanges used in these devices are provided circumferentially with screw connections that are positioned tightly next to one another so that between the individual screw connections, but also inwardly toward the housing or foundation, only minimal space is available. Only toward the exterior the screw connection is freely accessible and therefore has sufficient space for manual actuation of the closing mechanism by means of a closing lever.

Advantageous embodiment of the nuts according to the invention are disclosed in the dependant claims.

BRIEF DESCRIPTION OF THE DRAWINGS

Embodiments of the invention will be explained in the following with reference to the drawings.

FIG. 1 shows in a perspective illustration a nut that is comprised of two segments and is illustrated in the closed position.

FIG. 2 shows the nut according to FIG. 1 in the open position.

FIG. 3 is a simplified plan view onto the closed nut.

FIG. 4 shows an example of use for a nut according to the invention.

DESCRIPTION OF PREFERRED EMBODIMENTS

The nut 1 illustrated in the drawing is comprised of two jaws or segments 1a, 1b that are pivotable relative to one another. Opening of the segments 1a, 1b, as illustrated in FIG. 2, effects also an opening of the inner thread sections 2a, 2b provided thereat so that this nut can be moved along a threaded bolt or a screw in the axial direction to the desired longitudinal position without this requiring the cumbersome screwing action along the thread length of the threaded bolt or the screw. Even on long threaded bolts this nut can therefore be very quickly positioned at the desired longitudinal position and then be secured by closing the jaws.

In principle, two different embodiments are possible. In a first embodiment, the two inner thread sections 2a, 2b complement one another to a complete standard inner thread when the nut 1 is closed. In its closed position, such a nut can therefore be screwed like any other nut.

In a second embodiment, the two inner thread segments 2a, 2b in the closed position of the nut 1 combine to a clamping thread whose thread flanks will clamp frictionally on corresponding thread flanks of the threaded bolt or of the screw. In its closed position, such a nut cannot be turned or turned only by application of great torque on the corresponding outer thread.

The basic configuration of the nut according to the invention is incidentally the same for both embodiments. The two segments 1a, 1b that are identical in size and preferably are identical in their configuration are pivotable relative to one another at an angle and for this purpose are pivotably connected to one another at a first end area 11. Opening of the nut is realized however at a second end area 12 which for this purpose is provided with closing means to be explained in the following.

The two segments 1a, 1b have outer surfaces 4 shaped like half-shells and abut in the closed position of the nut at separating planes 5, 6. For realizing a pivot joint 13, an intermediate joint member 14 extends past the separating planes 5 of the first end area 11. The intermediate joint member 14 is supported by means of a first bolt 15 at the first segment 1a and by means of a second bolt 16 at the other segment 1b. Therefore, the pivot joint 13 is embodied as a double joint that, on the one hand, enables a wide opening of the threaded sections 2a, 2b while a simultaneous symmetric closing action is possible and, on the other hand, enables the use of two identically designed segments 1a, 1b leading to advantages with regard to production technology.

In the radial outer area of the separating plane 5 the outer surfaces of the segments 1a, 1b move away from one another at a curvature 19. This enables a wide opening of the two jaws without causing in the area of the separating planes a jamming action. Preferably, the two curvatures 19 have a radius relative to the center axis of the first bolt 15 and of the second bolt 16, respectively.

The closing means arranged in the second end area 12 and thus in the area of the second separating plane 6 are comprised of a lever mechanism 20 comprising closing lever 22 that is pivotably supported at the first segment 1a on a pivot axis 21 and a further lever 23 that, in the described embodiment, has the configuration of a radially outwardly curved arc. The lever 23 is connected at the joint 25 to the closure lever 22 while the other end of the lever 23 is rotatably supported on an axis 24 which axis 24 is located in the segment 1b. As a result of this lever construction a movement of the closing lever 22 in the closing direction S leads to a mutual closing of the segments until they abut one another in the separating plane 6. In the closed position the elements of the lever mechanism 20 have an over dead center position so that the three-point lever mechanism in the closed position is secured against accidental release. The dead center position that results from the pivot points 24, 21 and 25 is indicated in FIG. 3 by angle α. By means of the lever arm of the closing lever 22 that projects substantially radially outwardly and its support on the pivot axis 21 in the segment 1a, a high closing or clamping force of the nut is achievable. It is advantageous that the actuating elements of the lever mechanism 22 are limited to a circumferential section of the nut, i.e., the pivot area of the lever 22, so that even in spatially tight locations a securing of the nut is possible.

In the outer surface 4 of the segments 1a, 1b a thread 27 opens, respectively, which thread serves for secure anchoring of the fastening element 29. The fastening element 29 can be e.g. an annular eye that is threaded into the thread 27 (compare FIG. 4). Preferably, both jaws 1a, 1b are provided with such threads 27 so that the fastening element 29 can alternately be screwed into one or the other jaw.

In FIG. 4 an example of use of the described nut 1 is illustrated. It is attached on the closest thread near a hydraulic screw clamping cylinder 30 whose flying-off upon actuation is to be prevented. A belt that is fastened to the fastening element 29 serves as a safety means 31. For a sufficient securing of the safety belt it is therefore not required to first screw the nut 1 onto the neighboring outer thread by turning it several times. Instead, the nut is simply opened, in the open state positioned in the longitudinal direction onto the existing thread, and then closed. This can be realized in a few seconds.

The specification incorporates by reference the entire disclosure of German priority document 10 2007 062 615.2 having a filing date of 22 Dec. 2007.

While specific embodiments of the invention have been shown and described in detail to illustrate the inventive principles, it will be understood that the invention may be embodied otherwise without departing from such principles.

What is claimed is:

1. A nut for screw connections, the nut comprising:
   segments extending in a circumferential direction of the nut, wherein the segments are substantially of same size, abut one another in separating planes, and are movably guided relative to one another between an open position and a closed position;
   a lever mechanism that moves the segments toward one another into the closed position;
   wherein the segments each have a first end area and a second end area, wherein the first end areas of the segments are pivotably connected to one another by a pivot joint so that the segments are pivotable relative to one another;
   wherein the pivot joint is a double joint comprising an intermediate joint member extending transversely to the separating planes;
   wherein the lever mechanism comprises a closing lever directly supported on a first one of the segments on a pivot axis so as to be fixedly but pivotably connected to the first segment and a further lever fixedly but pivotably connected to a second one of the segments, wherein the closing lever is fixedly but pivotably connected to the further lever and acts on the further lever for actuating the segments between the open position and the closed position, wherein the closing lever projects outwardly past an outer surface of the nut;
   wherein, in the open position, the second end areas of the first and second segments remain connected to each other by the lever mechanism;
   a fastening element rigidly formed on at least one of the segments for connecting a safety belt.

2. The nut according to claim 1, wherein the lever mechanism loads the segments in the second end areas.

3. The nut according to claim 1, wherein the lever mechanism is a three-point mechanism that, in the closed position of the segments, is secured in an over dead center position.

* * * * *